US011105293B2

(12) United States Patent
Freeman

(10) Patent No.: US 11,105,293 B2
(45) Date of Patent: Aug. 31, 2021

(54) PORT BELT ARRANGEMENT

(71) Applicant: COX POWERTRAIN LIMITED, Lancing (GB)

(72) Inventor: Euan Freeman, Lancing (GB)

(73) Assignee: COX POWERTRAIN LIMITED, Shoreham-By-Sea (GB)

( * ) Notice: Subject to any disclaimer, the term of this patent is extended or adjusted under 35 U.S.C. 154(b) by 0 days.

(21) Appl. No.: 16/323,441

(22) PCT Filed: Aug. 2, 2017

(86) PCT No.: PCT/EP2017/069525
§ 371 (c)(1),
(2) Date: Feb. 5, 2019

(87) PCT Pub. No.: WO2018/024771
PCT Pub. Date: Feb. 8, 2018

(65) Prior Publication Data
US 2019/0178199 A1    Jun. 13, 2019

(30) Foreign Application Priority Data

Aug. 5, 2016   (GB) ..................................... 1613509

(51) Int. Cl.
*F02F 1/22*       (2006.01)
*F02B 25/26*    (2006.01)
(Continued)

(52) U.S. Cl.
CPC ................ *F02F 1/22* (2013.01); *F02B 25/26* (2013.01); *F02B 75/02* (2013.01); *F02B 75/20* (2013.01);
(Continued)

(58) Field of Classification Search
CPC .. F02F 1/22; F02B 75/02; F02B 25/26; F02B 75/20; F02B 2075/025; F02B 2075/1808; F02B 25/14; F02B 2700/037
See application file for complete search history.

(56) References Cited

U.S. PATENT DOCUMENTS 1,749,859 A     3/1930  Ulrich
1,839,576 A     1/1932  Mohr et al.
(Continued)

FOREIGN PATENT DOCUMENTS

CN     102230421    11/2011
CN     102733947    10/2012
(Continued)

OTHER PUBLICATIONS

First Search Report issued in App. No. GB1613509.7 (dated Jan. 11, 2017).

(Continued)

*Primary Examiner* — Jacob M Amick
*Assistant Examiner* — Charles J Brauch
(74) *Attorney, Agent, or Firm* — Barnes & Thornburg LLP

(57) ABSTRACT

A port belt arrangement for use in a two-stroke internal combustion engine containing a pair of adjacent cylinders. The arrangement including a first hollow annulus defining a first annular channel, the first annular channel tapering in a radial direction, with increasing circumferential distance from a first port, an inner wall of the first annular channel having a second port, and a second hollow annulus defining a second annular channel, the second annular channel tapering in a radial direction, with increasing circumferential distance from a third port, an inner wall of the second annular channel having a fourth port, wherein the first hollow annulus and the second hollow annulus are joined (Continued)

together at a joining point located on each of their circumferences. The cross-sectional area of the first annular channel at the joining point is less than the cross-sectional area of the first annular channel at the point on the circumference of the first hollow annulus which is furthest from the joining point.

25 Claims, 3 Drawing Sheets

(51) Int. Cl.
  *F02B 75/20* (2006.01)
  *F02B 75/02* (2006.01)
  *F02B 75/18* (2006.01)
(52) U.S. Cl.
  CPC . *F02B 2075/025* (2013.01); *F02B 2075/1808* (2013.01)

(56) References Cited

U.S. PATENT DOCUMENTS

| | | | |
|---|---|---|---|
| 1,950,970 A | * | 3/1934 | Chilton ................... F02B 75/26 |
| | | | 123/51 B |
| 2,001,854 A | | 5/1935 | Shoemaker et al. |
| 5,080,081 A | | 1/1992 | Kawamura |
| 2011/0030654 A1 | | 2/2011 | Taylor |

FOREIGN PATENT DOCUMENTS

| | | |
|---|---|---|
| DE | 3821617 | 1/1989 |
| EP | 0409428 | 1/1991 |
| GB | 368759 | 3/1932 |
| GB | 516419 | 2/1940 |
| GB | 588951 | 6/1947 |
| JP | S54-147321 | 11/1979 |
| JP | S63-115529 U | 7/1988 |
| JP | H03-50325 | 3/1991 |
| JP | H06-159067 | 6/1994 |
| JP | H08-246879 | 9/1996 |
| SK | 90099 | 1/2001 |

OTHER PUBLICATIONS

Second Search Report issued in App. No. GB1613509.7 (dated Feb. 7, 2017).
Int'l Search Report and Written Opinion issued in App. No. PCT/EP2017/069525 (dated 2018).
Office Action issued in Appl. No. JP2019-527956 (dated Mar. 2, 2021).

* cited by examiner

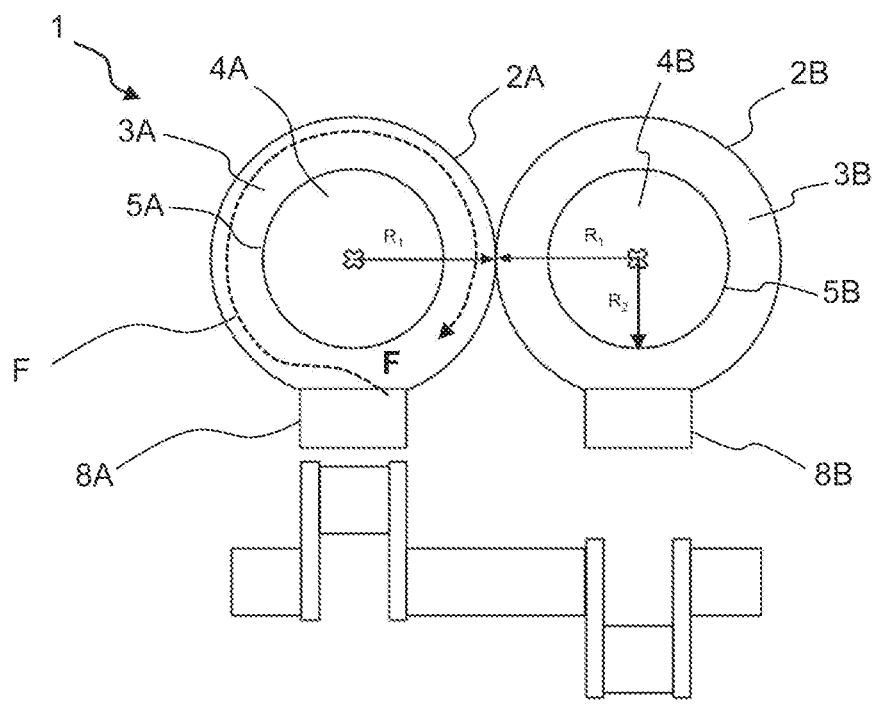
Fig. 1A – PRIOR ART

PORT BELT ARRANGEMENT

CROSS REFERENCE TO RELATED APPLICATIONS

This application is a U.S. nationalization under 35 U.S.C. § 371 of International Application No. PCT/EP2017/069525, filed 2 Aug. 2017, which claims priority to United Kingdom Patent Application No. 1613509.7, filed 5 Aug. 2016. The disclosures set forth in the referenced applications are incorporated herein by reference in their entireties.

TECHNICAL FIELD OF THE INVENTION

The present invention relates to port belts and port belt arrangements for use in two-stroke internal combustion engines, in particular those including a pair of adjacent cylinders. The present invention also relates to engines containing the port belt arrangements, and vehicles containing those engines.

BACKGROUND TO THE INVENTION

In conventional two stroke internal combustion engines (whether spark or compression ignition) charge air is typically introduced into each cylinder through a series of inlet ports spaced circumferentially around the cylinder wall. It is also common for exhaust gases (i.e. combustion products) to be discharged from the cylinder through a similar series of exhaust ports spaced circumferentially around the cylinder wall and spaced longitudinally along the cylinder wall from the inlet ports. To supply charge air (typically pressurised) to the inlet ports it is known to use a port belt, which defines an annular channel that extends around the cylinder adjacent the inlet ports, to distribute the charge air from a single inlet around the circumference of the cylinder wall from where it can enter the cylinder through the inlet ports. Similarly, a port belt can be used to receive exhaust gases discharged from the cylinder through the exhaust ports and channel these gases to a single outlet.

FIG. 1A shows an example of a known dual port belt arrangement 1, which includes two substantially identical port belts 2A and 2B. Because the port belts 2A and 2B are substantially identical, the following description is directed towards only the first port belt 2A. Equivalent features on each of the port belts 2A and 2B have the same reference numeral, with features on the first port belt 2A designated "A" and features on the second port belt 2B designated "B".

Port belt 2A includes hollow annulus 3A, the inner wall 5A of which surrounds the cylinder 4A. The hollow annulus 3A has an outer radius $R_1$ and the cylinder 4A has a radius $R_2$. An inlet port 8A is provided at one side of the hollow annulus 3A, through which charge air (e.g. from a supercharger, a turbocharger, crankcase compression or a combination of these) may enter the annular channel defined within the hollow annulus 3A. In use, charge air flows around the annular channel along the flowpath F. Charge air then passes from the annular channel to the cylinder 4A via ports (not shown) spaced circumferentially around the inner wall 5A/the outer wall of the cylinder 4A.

In the port belt arrangement 1 shown in FIG. 1A, the spacing of the cylinders 4A, 4B must be at least $2R_1$, which necessitates a compromise between the breathing performance and the total package size of the engine. Additionally, distributing airflow around the cylinder is difficult with traditional port belt designs, such as that of FIG. 1, and this difficulty is exacerbated with highly dynamic inlet conditions. This is generally overcome by the inclusion of additional baffles inside the cylinder, which can inhibit the breathing of the engine.

SUMMARY OF THE INVENTION

At its most general, a first aspect of the present invention provides a port belt arrangement for use in a two-stroke internal combustion engine, having at least one "scroll-shaped" port belt, in order to enable the spacing between a pair of cylinders to be reduced, resulting in improved breathing efficiency for a given package size.

More specifically, a first aspect of the present invention provides a port belt arrangement for use in a two-stroke internal combustion engine containing a pair of adjacent cylinders, the arrangement including:

a first hollow annulus defining a first annular channel, the channel tapering in a radial dimension with increasing circumferential distance from a first port, an inner wall of the first annular channel having a second port (or a series of circumferentially spaced second ports);

a second hollow annulus defining a second annular channel, the channel tapering in a radial dimension with increasing circumferential distance from a third port, an inner wall of the second annular channel having a fourth port (or a series of circumferentially spaced fourth ports);

wherein:

the first hollow annulus and the second hollow annulus are joined together at a joining point located on each of their circumferences; and the cross-sectional area of the first annular channel at the joining point is less than the cross sectional area of the first annular channel at the point on the circumference of the first hollow annulus which is furthest from the joining point.

In the following description (having a first hollow annulus and a second hollow annulus joined at a joining point), the terms "dual port belt" or "port belt" may refer to the figure-of-eight-, or lemniscate-shaped component formed by the two joined annuli. Each of the first hollow annulus and the second hollow annulus define a central aperture, configured to receive a first cylinder and a second cylinder. The term "annular" or "annulus" refers to generally ring-shaped structures, for example (though by no means restricted to) circular ring shapes, or toroidal structures. For example, in some embodiments, the first hollow annulus and/or the second hollow annulus may be formed of an inner cylindrical shell and an outer cylindrical shell, the upper and lower edges of the respective shells being joined by annular surfaces, which may be planar, or curved. The hollow annulus may be generally elliptical.

A median plane may be defined as the plane including the joining point, the first hollow annulus located on one side of the median plane, and the second hollow annulus on the other side of the median plane. It should also be noted that though the first hollow annulus and second hollow annulus are joined together, first and second annular channels, i.e. the annular volumes contained within the first hollow annulus and second hollow annulus are not joined together.

The term "port" as used in the present application may refer to an opening which allows gas to flow from one component to another component. For example, the ports may be holes in component walls of the port belt arrangement, however they are not restricted only to this. For example, in some embodiments of the invention, the open end of a channel, pipe, tube or cylindrical shell may be referred to as a port without departing from the scope of the present invention.

"Annular channels" as envisaged in the present application do not necessarily join at both ends, and they may for example, only extend around the majority of the circumference of the hollow annulus, without departing from the scope of the present invention.

By having the joining point located at the point on the circumference of the first hollow annulus where the cross-sectional area of the first annular channel is smallest, the distance between the centres of the first hollow annulus and second hollow annulus may be minimised. The separation of the centres of the first hollow annulus and the second hollow annulus is therefore less than half of the maximum total width of the port belt arrangement, the width measured in the direction of the line joining the centre of the first hollow annulus and the centre of the second hollow annulus. Because, in engines employing the port belt arrangements of the present invention, the first cylinder and the second cylinder can be closer together, the whole engine can be more efficiently packed.

In order to further reduce the distance between the cylinders, the cross-sectional area of the second annular channel at the joining point may be less than the cross-sectional area of the second annular channel at the point on the circumference of the second hollow annulus which is furthest from the joining point. The joining point is then located at or near the region of each of the first annular channel and the second annular channel where they are at their narrowest (i.e. having the smallest cross-sectional area), further reducing the distance between the centres of the first hollow annulus and the second annulus. The port belt arrangement is preferably symmetrical about the median plane as defined above.

The cylinders in a two-stroke internal combustion engine may be parallel to each other. In order to accommodate a parallel pair of cylinders, it is preferable that the first hollow annulus and second hollow annulus are coplanar or substantially coplanar. In other words, the line connecting the centres of the first hollow annulus and the second hollow annulus preferably lies in a plane perpendicular to the axes of both the first and second hollow annulus. In order to further improve the packing of components, the first hollow annulus and the second hollow annulus preferably share a common outer wall. Alternatively, the cylinders in a two-stroke internal combustion engine may be arranged in a V-shaped configuration. In this case, the planes of the first annulus and the second annulus are preferably angled with respect to each other, in order to accommodate two cylinders arranged in said V-shaped configuration.

The port belt arrangement may include the first cylinder and the second cylinder of the engine, which are located adjacent to each other. In this case, the inner walls of the first hollow annulus and the second hollow annulus may be formed by an outer wall of the first cylinder and the second cylinder respectively. Thus, the first and second annular channels may be defined, respectively, by an outer wall of the first hollow annulus and the second hollow annulus, and outer surfaces of the walls of the first and second cylinders.

Accordingly, it will be understood that the second port of the first annular channel and the fourth port of the second annular channel may be openings in an outer wall of each cylinder, to provide fluid communication between each annular channel and its respective cylinder. These embodiments, where the first hollow annulus and the second hollow annulus have no inner wall, may be referred to as "shell" embodiments, since the first annular channel and the second annular channel are only formed when the port belt is assembled with the cylinders.

Alternatively, in embodiments which may be referred to as "full channel" embodiments, the first hollow annulus and the second hollow annulus may both have an inner wall, in which the second and fourth ports are formed. The inner wall defines an aperture in the centre of each of the first hollow annulus and second hollow annulus. In these embodiments, the first annular channel and the second annular channel are defined respectively by the walls of the first hollow annulus and the second hollow annulus respectively, and not by the walls of the cylinders, around which the port belt is assembled. In these embodiments, the second port(s) of the first hollow annulus is/are preferably located to provide fluid communication between the first annular channel and the first cylinder, via a port (more preferably a series of ports) formed in the wall of the first cylinder. Likewise, the fourth port(s) of the second hollow annulus is/are preferably located to provide fluid communication between the second annular channel and the second cylinder.

Whether or not the port belt arrangement includes the cylinders themselves is immaterial to the other optional features of the invention, except where they are clearly incompatible with either the shell or full channel embodiments.

Port belt arrangements according to the first aspect of the invention, broadly speaking, may be used in two distinct ways: either as an intake port belt arrangement, or as an exhaust port belt arrangement. These are discussed in turn below.

The purpose of an intake port belt arrangement is to guide charge air, which may be pressurized charge air or supercharged air from the supercharger of an internal combustion engine, to the cylinder of the same engine. In intake port belt arrangements, the first port and the third port are inlet ports, arranged to allow the flow of gas from the supercharger to the first annular channel and the second annular channel respectively. In the same embodiments, the second port(s) and the fourth port(s) are cylinder inlet ports, arranged, in use, to allow the flow of gas from the first annular channel to a first corresponding cylinder, and from the second annular channel to a second corresponding cylinder. A gas flowpath is therefore defined in the first annular channel from the first (inlet) port to the second (cylinder inlet) port(s), and in the second annular channel from the third (inlet) port to the fourth (cylinder inlet) port(s).

The radially tapering cross-section of each annular channel, with increasing circumferential distance from its inlet port (i.e. further along the gas flowpath) helps ensure that, in use, the gas is directed into the corresponding cylinder via the cylinder inlet port(s), and ensures an even distribution of gas to all of the second ports and fourth ports.

As well as radially tapering, the first and the second annular channels may also taper in their depth (i.e. in its dimension which is parallel to the axis of the cylinder) with increasing circumferential distance from its inlet port, to achieve a greater reduction in cross-sectional area along the gas flowpath.

Still referring to intake port belt arrangements, the engine design can be further simplified by supplying the first port and the third port (i.e. the inlets to the two annular channels) from the same main inlet port. Accordingly, the first port and the third port are preferably arranged to be in fluid communication with a single main inlet. The main inlet is preferably configured to supply the first and third ports (i.e. the inlet ports) with supercharged air from a gas source such as a supercharger. The main inlet may simply be in the form of a single channel having sufficient width to cover both the inlet ports. The flowpath of supercharged air through the annular channels is described in more detail with reference to the drawings, later in the application. In other embodiments, e.g. for packaging reasons, the first and second annular channels may be fed from two separate inlets (i.e. one associated with each of the first port and the third port), rather than a single main inlet.

In embodiments including a single main inlet as described above, the port belt arrangement may include a septum or separating wall between the first annular channel and the second annular channel, which is arranged to separate gas flowing from the main inlet into two separate streams, one flowing into the first annular channel, the other flowing into the second annular channel. The septum or separating wall is preferably parallel or substantially parallel to the median plane defined above. The septum is preferably integral with the outer walls of one or both of the first hollow annulus and the second hollow annulus. The width of the septum preferably increases with increasing distance from the main inlet, and furthermore preferably has a concave shape on both sides. In preferred embodiments the septum is symmetrical about the median plane, as defined above.

In intake port belt arrangements, the second port and the fourth ports respectively provide fluid communication between the first annular channel and the first cylinder, and the second annular channel and the second cylinder. For improved and more even flow of gas into the cylinder, it is preferable that the first hollow annulus and the second hollow annulus each include a plurality of second/fourth ports (referred to in the following as cylinder inlet ports) through which the charge air flows into the cylinder. These cylinder inlet ports are preferably evenly circumferentially distributed about the inner wall of their respective annular channels. The side walls of each cylinder inlet port are preferably oriented obliquely relative to the surface of the inner wall of the annulus adjacent the port, or in other words, to the direction of the gas flowpath in the annular chamber at that point. In this way, as gas flows along the annular channel, it is directed through the cylinder inlet ports into the cylinder at an angle, causing the gas to swirl around the cylinder, thus enabling improved mixing of the fuel and gas (which is preferably supercharged air). In preferred embodiments, the angle is selected to achieve the correct swirl. If the angle is too large then there will either be insufficient air motion within the cylinder to promote good combustion. If the angle is too small then air motion may be excessive causing over break-up of the fuel spray and the generation of excessive pumping losses due to a restrictive flow effect. Accordingly, the angle is preferably no less than 20° between the side walls of the cylinder inlet port and the inner wall of the annular channel, which may be the outer wall of the cylinder. Furthermore this angle is also no more than 90°.

The narrowest point of the first annular channel and the second annular channel is located at the end of the gas flowpath, and accordingly, gas reaches these points last. So, less gas reaches this point of the flowpath, since most gas has already entered the cylinder via the preceding outlet ports. Thus, there is a reduced gas mass-flow as a result of the reduction in cross-sectional area. The reduction in cross-sectional area also helps to achieve a constant flow velocity and a constant gas pressure (though there may be a small reduction therein due to skin friction). In order to supplement the mass-flow at this point, the first hollow annulus may include a supplementary inlet port arranged to direct gas from the main inlet of the port belt arrangement to the region of the first annular channel at or near the portion of the first annular channel having the smallest cross sectional area. In this way, the narrowest portion of the first annular channel is in fluid communication with the main inlet port directly, i.e. other than via the remainder of the first annular channel. This allows an increased amount of gas to be incident upon, and correspondingly flow through the cylinder inlet port or ports which are located at the far end of the gas flowpath. A corresponding supplementary inlet may also be provided for the second hollow annulus. In preferred embodiments, there are a plurality of supplementary inlets on each of the first hollow annulus and the second hollow annulus. These supplementary inlets are preferably shaped to meet the corresponding annular channel obliquely, so that air entering the annular channel via the supplementary channel does so at an angle of no more than 90° to the direction of airflow and an angle of no less than 20°. The smaller the angle, the reduced risk of turbulent flow arising as the two rapidly flowing streams of gas merge.

Supplementary inlets are preferably arranged symmetrically about the median plane, as described above.

As discussed above, the port belt arrangement may also be used as an exhaust port belt arrangement, in which the belt is used to guide exhaust gases from the cylinder to an exhaust outlet. In these embodiments, the first, second, third and fourth ports have the opposite function to their function in the above-described intake port belt arrangement. Specifically, the second port and fourth port are cylinder exhaust ports providing fluid communication between the first and second cylinders and the first and second annular channels respectively. In the same embodiments, the first port and the third port form outlet ports, which are configured respectively to convey exhaust gases from the first annular channel and the second annular to an exhaust outlet. Accordingly, a gas flowpath is defined in the first annular channel from the second (cylinder exhaust) port, to the first (outlet) port, and in the second annular channel from the fourth (cylinder exhaust) port to the third (outlet) port. The widening shape of the first annular channel and the second annular channel towards the outlet port (i.e. the first and third ports), i.e. further along the flowpath, ensures that there is sufficient volume in the annular channels for the gases exiting the cylinder to flow along the channels. As with intake port belt arrangements, it is also preferable in exhaust port belt arrangements for the first and second annular channels to taper in a direction which is substantially perpendicular to the plane of the corresponding hollow annulus (i.e. parallel with the engine cylinder axis), with increasing circumferential distance from the first and third ports respectively.

In order to simplify the design of the engine, the exhaust port belt arrangement may further include an exhaust outlet which is in fluid communication with the first and third ports. The exhaust outlet may be in the form of a channel which has sufficient width to cover both of the first and third ports.

In exhaust port belt arrangements, the second port and the fourth port respectively provide fluid communication between the first annular channel and the first cylinder, and the second annular channel and the second cylinder. For improved flow of gas from the cylinders into their respective channels, it is preferable that each hollow annulus includes a plurality of second/fourth ports (i.e. cylinder exhaust ports), which may be evenly circumferentially distributed about the inner wall of the respective annular channels. The side walls of each cylinder exhaust port are preferably oriented obliquely relative to the surface of the inner wall surrounding the cylinder exhaust port, or in other words, to the direction of the gas flowpath at that point. Accordingly, the angle is preferably no less than 20° between the side walls of the cylinder exhaust port and the inner wall of the annular channel, which may be the outer wall of the cylinder. Furthermore this angle is also no more than 90°. In this way, as exhaust gas is forced out of the cylinder (either by the motion of the piston, or by scavenging), it is directed into and around the annular channel in the direction of the desired flowpath, i.e. towards the outlet port.

Intake port belts according to aspects of the present invention may be made of a high grade plastic, plastic matrix composites, or metal. Exhaust port belts may be made of metal or a metallic matrix composite.

A second aspect of the present invention provides a port belt for use in a two-stroke internal combustion engine, the port belt having a hollow annulus defining an annular channel, the annular channel tapering in a direction substantially perpendicular to the plane of the hollow annulus (i.e. parallel to the longitudinal axis of the cylinder it surrounds), with increasing circumferential distance from a first port, an inner wall of the hollow annulus having a second port.

Port belts according to the second aspect of the invention may include any of the optional features described above with reference to the first aspect of the invention. In particular, it should be noted that a dual port belt arrangement, which is analogous to the first aspect of the present engine may be provided by joining a first port belt and a second port belt, both according to the second aspect of the invention, together at a joining point located on each of their circumferences so that the cross-sectional area of the annular channel of the first belt at the joining point is less than the cross-sectional area of the annular channel of the first port belt at the point on the circumference of the hollow annulus of the first port belt which is furthest from the joining point.

A third aspect of the present invention provides a port belt for use in a two-stroke internal combustion engine, the port belt having a hollow annulus defining an annular channel having an inlet port and an outlet port, the inlet port and the outlet port defining a gas flowpath circumferentially around most of the annular channel, and wherein a wall of the first hollow annulus further includes a supplementary inlet arranged to direct gas into the annular channel at a point in its circumference which is closer to the outlet port than the inlet port.

Like the second aspect of the invention, port belts according to the third aspect of the invention may include any of the optional features described with reference to the first aspect of the invention. A dual port belt arrangement, like in the first aspect of the invention may also be provided by joining two port belts of the third aspect of the invention together at a joining point on each of their circumferences.

A fourth aspect of the invention provides a port belt arrangement for use in a two-stroke internal combustion engine containing a pair of adjacent cylinders, the arrangement including:
 a first hollow annulus defining a first annular channel, the first annular channel tapering in a radial direction, with increasing circumferential distance from a first port, an inner wall of the first annular channel having a second port; and
 a second hollow annulus defining a second annular channel, the second annular channel tapering in a radial direction, with increasing circumferential distance from a third port, an inner wall of the second annular channel having a fourth port;

wherein:
 the first hollow annulus and the second hollow annulus are joined together at a joining point located on each of their circumferences.

A fifth aspect of the invention provides a two-stroke internal combustion engine including a first cylinder and a second cylinder, and a dual port belt arrangement of any of the first, second, third and fourth aspects of the invention. Such an internal combustion engine may include a plurality of pairs of cylinders, each having an associated dual port belt arrangement according to the first, second, third or fourth aspects of the invention.

Such a two-stroke internal combustion engine may be used in a number of larger pieces of machinery, such as power generators, on- and off-road wheeled or tracked vehicles, amphibious vehicles, light aircraft and helicopters. Accordingly a sixth aspect of the present invention provides a vehicle containing the two-stroke internal combustion engine of the fifth aspect of the present invention.

BRIEF DESCRIPTION OF THE DRAWINGS

Embodiments of the present invention will now be described with reference to the drawings, in which:

FIG. 1A is a schematic diagram of a known dual port belt arrangement.

FIG. 1B shows an intake port belt arrangement, and FIG. 1C shows an exhaust port belt arrangement.

Further optional features of the invention are set out in the description below.

DETAILED DESCRIPTION OF THE DRAWINGS

Figure 1B:
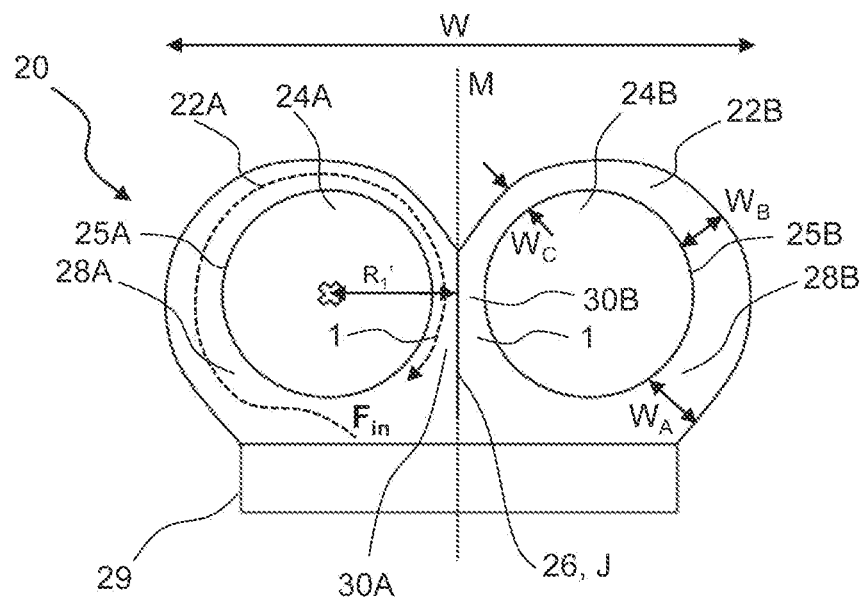
FIGS. 1B and 1C are schematic diagrams showing a plan view of a dual port belt arrangement according to embodiments of the present invention.
Figure 1C:
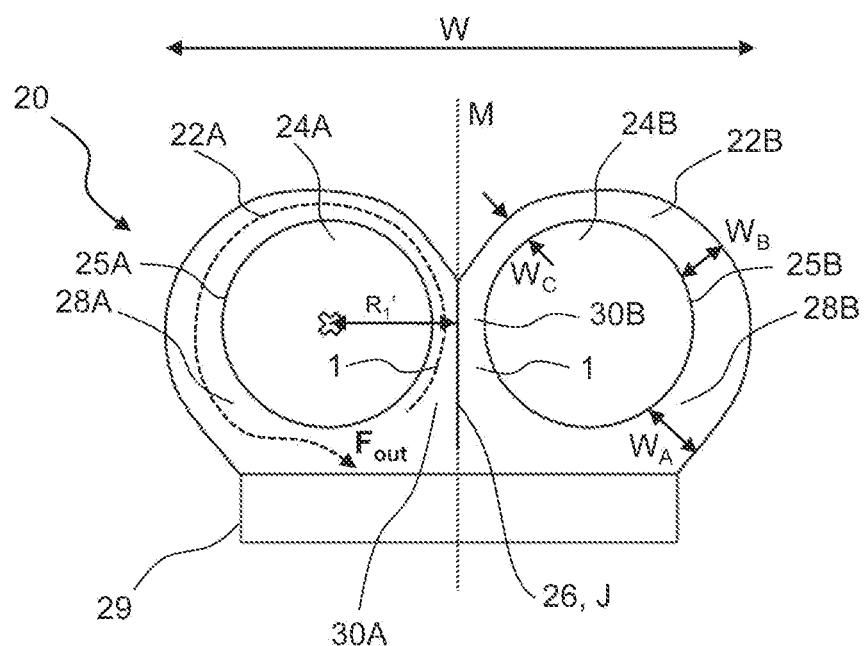

FIGS. 1B and 1C are cross sections through a port belt arrangement 20 according to an embodiment of the first aspect of the invention. These two arrangements differ in that FIG. 1B shows an intake port belt arrangement, and FIG. 1C shows an exhaust port belt arrangement. Structurally, these are the same, the only difference between the two being the direction of gas flow through the annuli 22A, 22B is reversed. Description of the structural features of the arrangements is not repeated here, and identical reference numerals in FIGS. 1B and 1C refer to the same features.

The arrangement 20 includes two substantially identical (i.e. mirror-image) hollow annuli 22A, 22B each having a central opening 24A, 24B defined by an inner wall 25A, 25B. The two hollow annuli 22A, 22B are joined at a joining point J, which in the present embodiments is a line along which the annuli abut one another. A septum 26 separates the annular channels. The port belt arrangement 20 is symmetrical about median plane M. Both of the hollow annuli 22A, 22B define an annular channel, which are separated by a septum 26, each having an inlet 28A, 28B, which is fed from main inlet 29, which is in the form of a channel having sufficient width to cover both the inlets 28A, 28B. In embodiments used as an intake port belt, supercharged air flows around the annular channel from the main inlet 29, as shown by flowpath $F_{in}$ for annulus 22A (FIG. 1B only). The flow path in annulus 22B would be the mirror image (about median line M) of that shown for annulus 22A. In embodiments used an as exhaust port belt arrangement i.e. in FIG. 1C, exhaust gases flow from the cylinder into the annular channels, via cylinder ports (not shown) in the inner wall 25A, 25B, out via the outlet 28A, 28B (which acted as an inlet in FIG. 1B). In FIG. 1C, the flowpath is denoted $F_{out}$.

The annular channel tapers along the flowpath $F_{in}$. For example, in the right-hand hollow annulus 22B, $W_A > W_B > W_C$. As a result, the cross-sectional area of the annular channel also decreases. Thus, it can be seen that the two hollow annuli 22A, 22B are joined near the region 30A, 30B at which they are narrowest. By doing so, in use, the separation of the centres of the two cylinders, is less than the separation in the prior art port belt arrangement 1 shown in FIG. 1A. The separation $2R_1'$ is less than half the total width W of the port belt arrangement 20.

Figure 2A:
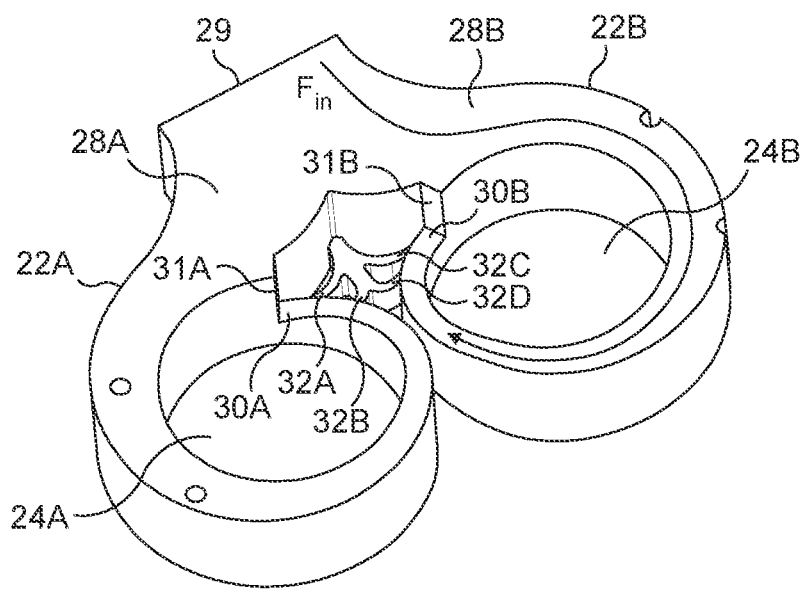
FIG. 2A is a perspective view showing the enclosed volume of a dual port belt arrangement according to embodiments of the present invention, in which the dual port belt arrangement is used as an intake dual port belt arrangement.
Figure 2B:
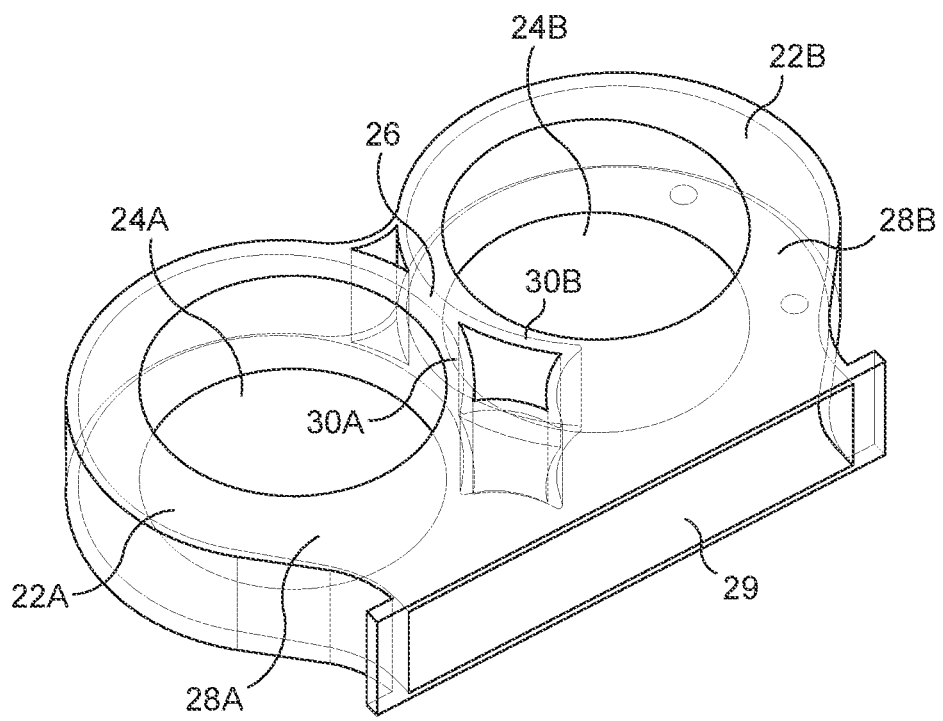
FIG. 2B is a perspective view showing an exterior view of a dual port belt arrangement according to embodiments of the present invention, in which the dual port belt arrangement is used as an exhaust dual port belt arrangement.

FIGS. 2A and 2B show perspective views of a port belt arrangement 20, according to the present invention. As will be noted, the port belt arrangement 20 shown in FIGS. 2A and 2B is an example of the "shell" embodiment as described above, the hollow annuli 22A, 22B having no inner wall. Specifically, 2A shows the internal enclosed volume of a port belt arrangement 20, i.e. the shape of the annular channel which is defined by the hollow annuli 22A, 22B. FIG. 2B shows an exterior view of the port belt arrangement 20. Features described with reference to FIG. 1B will not be described again here, for conciseness, but the perspective views do highlight some additional features. Firstly, there are supplementary inlets 32A-D connecting the main inlet 29 to the narrowest region 30A, 30B of the annular channel, in order to provide supercharged air to this region 30 without it first having to flow all the way around flowpath $F_{in}$, to ensure that the supercharged air enters the cylinder in a circumferentially evenly distributed manner. FIG. 2A also shows that the annular channel tapers in the height direction H, as well as the radial direction. It can also be seen that the widest point of the annular channel is in fluid communication with the narrowest point 30A, 30B, at step 31A, 31B, however, the inlets 28A, 28B are shaped so as to ensure that gas flows along flowpath $F_{in}$, rather than diverging and flowing both ways round the channel (except for the gas which enters through the supplementary inlets 32A-D).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A port belt arrangement for use in a two-stroke internal combustion engine containing a pair of adjacent cylinders, the arrangement including:
a first hollow annulus having an outer wall and an inner wall and defining a first annular channel between the outer and inner walls, the first annular channel tapering in a radial direction, with increasing circumferential distance from a first port, the first hollow annulus defining a first central aperture configured to receive a first cylinder; and
a second hollow annulus having an outer wall and an inner wall and defining a second annular channel between the outer and inner walls, the second annular channel tapering in a radial direction, with increasing circumferential distance from a third port, the second hollow annulus defining a second central aperture configured to receive a second cylinder;
wherein:
a second port is located in the inner wall of the first hollow annulus;
a fourth port is located in the inner wall of the second hollow annulus;
the first hollow annulus and the second hollow annulus are joined together at a joining point located on each of their circumferences;
the cross-sectional area of the first annular channel at the joining point is less than the cross-sectional area of the first annular channel at the point on the circumference of the first hollow annulus which is furthest from the joining point;
the first port and the third port are inlet ports for the annular channels;
the second port and the fourth port are cylinder inlet ports through which gas can flow from the annular channels toward the central apertures;
a first gas flowpath is defined, in the first annular channel, between the first port and the second port; and
a second gas flowpath is defined, in the second annular channel, between the third port and the fourth port.

2. A port belt arrangement according to claim 1, wherein the cross-sectional area of the second annular channel at the joining point is less than the cross-sectional area of the second annular channel at the point on the circumference of the second hollow annulus which is furthest from the joining point.

3. A port belt arrangement according to claim 2, wherein:
a median plane is defined as the plane including the joining point, the first hollow annulus located on one side of the median plane, and the second hollow annulus located on the opposite side of the median plane; and
the port belt arrangement is symmetrical or substantially symmetrical about the median plane.

4. A port belt arrangement according to claim 1, wherein the first hollow annulus and second hollow annulus are coplanar or substantially coplanar.

5. A port belt arrangement according to claim 1, further including:
a first cylinder passing through the first hollow annulus; and
a second cylinder passing through the second hollow annulus.

6. A port belt arrangement according to claim 5, wherein:
the second port is arranged to provide fluid communication between the first annular channel and the first cylinder via a hole in an outer wall of the first cylinder; and
the fourth port is arranged to provide fluid communication between the second annular channel and the second cylinder via a hole in an outer wall of the second cylinder.

7. A port belt arrangement according to claim 1, wherein the first hollow annulus and the second hollow annulus share a common outer wall.

8. A port belt arrangement according to claim 1, wherein:
the first port is arranged to deliver charge air to the first annular channel, and
the third port is arranged to deliver gas from a supercharger to the second annular channel.

9. A port belt arrangement according to claim 1, wherein the first port and the third port are in fluid communication with a single main inlet, which is arranged to deliver gas from a gas source.

10. A port belt arrangement, according to claim 9, further including a septum or separating wall arranged to separate gas flowing from the main inlet into a first stream directed towards the first annular channel, and a second stream directed towards the second annular channel.

11. A port belt arrangement according to claim 10, wherein the septum or separating wall increases in width with increasing distance from the main inlet.

12. A port belt arrangement according to claim 5, wherein:
the first hollow annulus includes a plurality of circumferentially distributed cylinder inlet ports, each providing fluid communication between the first annular channel and the first cylinder; and
the second hollow annulus includes a plurality of circumferentially distributed cylinder inlet ports, each providing fluid communication between the second annular channel and the second cylinder.

13. A port belt arrangement according to claim 1, wherein the side walls of a cylinder inlet port are oriented obliquely relative to the surface of either:
the inner wall of the first hollow annulus or second hollow annulus surrounding that cylinder inlet port, or
the direction of the gas flowpath at that point.

14. A port belt arrangement according to claim 9, wherein the first hollow annulus further includes a supplementary inlet port arranged to direct gas from the main inlet to or near to the region of the first annular channel having the smallest cross-sectional area.

15. A port belt arrangement for use in a two-stroke internal combustion engine containing a pair of adjacent cylinders, the arrangement including:
a first hollow annulus having an outer wall and an inner wall and defining a first annular channel between the outer and inner walls, the first annular channel tapering in a radial direction, with increasing circumferential distance from a first port, the first hollow annulus defining a first central aperture configured to receive a first cylinder; and
a second hollow annulus having an outer wall and an inner wall and defining a second annular channel between the outer and inner walls, the second annular channel tapering in a radial direction, with increasing circumferential distance from a third port, the second hollow annulus defining a second central aperture configured to receive a second cylinder;
wherein:
a second port is located in the inner wall of the first hollow annulus;
a fourth port is located in the inner wall of the second hollow annulus;
the first hollow annulus and the second hollow annulus are joined together at a joining point located on each of their circumferences;
the cross-sectional area of the first annular channel at the joining point is less than the cross-sectional area of the first annular channel at the point on the circumference of the first hollow annulus which is furthest from the joining point;
the first port and the third port are outlet ports from the annular channels; and
the second port and the fourth port are cylinder exhaust ports;
a first gas flowpath is defined, in the first annular channel, between the second port and the first port;
a second gas flowpath is defined, in the second annular channel, between the fourth port and the third port.

16. A port belt arrangement according to claim 15, further including an exhaust outlet in fluid communication with the first port and the third port.

17. A port belt arrangement according claim 15, wherein:
the first hollow annulus includes a plurality of circumferentially distributed cylinder exhaust ports, each providing fluid communication between the first annular channel and the first cylinder; and
the second hollow annulus includes a plurality of circumferentially distributed cylinder exhaust ports, each providing fluid communication between the second annular channel and the second cylinder.

18. A port belt arrangement according to claim 15, wherein the side walls of a cylinder exhaust port are oriented obliquely relative to the surface of either:
the inner wall of the first hollow annulus or second hollow annulus surrounding that cylinder exhaust port, or
the direction of the gas flowpath at that point.

19. A port belt arrangement according to claim 1, wherein the first annular channel and the second annular channel taper in a direction which is substantially perpendicular to the plane of the first hollow annulus and the second hollow annulus respectively, with increasing circumferential distance respectively from the first and third ports.

20. A port belt arrangement according to claim 15, further including:
a first cylinder passing through the first hollow annulus; and
a second cylinder passing through the second hollow annulus.

21. A port belt arrangement according to claim 15, wherein:
the second port is arranged to provide fluid communication between the first annular channel and the first cylinder via a hole in an outer wall of the first cylinder; and
the fourth port is arranged to provide fluid communication between the second annular channel and the second cylinder via a hole in an outer wall of the second cylinder.

22. A port belt arrangement according to claim 15, wherein the cross-sectional area of the second annular channel at the joining point is less than the cross-sectional area of the second annular channel at the point on the circumference of the second hollow annulus which is furthest from the joining point.

23. A port belt arrangement according to claim 22, wherein:
a median plane is defined as the plane including the joining point, the first hollow annulus located on one side of the median plane, and the second hollow annulus located on the opposite side of the median plane; and
the port belt arrangement is symmetrical or substantially symmetrical about the median plane.

24. A port belt arrangement according to claim 15, wherein the first hollow annulus and second hollow annulus are coplanar or substantially coplanar.

25. A port belt arrangement according to claim 15, wherein the first hollow annulus and the second hollow annulus share a common outer wall.

* * * * *